(12) United States Patent
Wu

(10) Patent No.: US 11,959,210 B2
(45) Date of Patent: Apr. 16, 2024

(54) NONWOVEN WITH TWO-PART BINDER SYSTEM

(71) Applicant: Owens Corning Intellectual Capital, LLC, Toledo, OH (US)

(72) Inventor: Tony Wu, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 537 days.

(21) Appl. No.: 17/056,074

(22) PCT Filed: Apr. 16, 2019

(86) PCT No.: PCT/US2019/027580
§ 371 (c)(1),
(2) Date: Nov. 17, 2020

(87) PCT Pub. No.: WO2019/221863
PCT Pub. Date: Nov. 21, 2019

(65) Prior Publication Data
US 2021/0207301 A1    Jul. 8, 2021

Related U.S. Application Data

(60) Provisional application No. 62/673,374, filed on May 18, 2018.

(51) Int. Cl.
*D04H 1/587*    (2012.01)
*B32B 5/02*    (2006.01)
(Continued)

(52) U.S. Cl.
CPC ............. *D04H 1/587* (2013.01); *B32B 5/022* (2013.01); *B32B 5/245* (2013.01); *B32B 13/14* (2013.01);
(Continued)

(58) Field of Classification Search
CPC . B32B 13/14; B32B 2255/02; B32B 2262/02; B32B 2262/06; B32B 2262/101;
(Continued)

(56) References Cited

U.S. PATENT DOCUMENTS 5,173,359 A    12/1992    Toyoshima et al.
5,716,892 A    2/1998    Kasano et al.
(Continued)

FOREIGN PATENT DOCUMENTS

EP    1544352 A2    6/2005
EP    2230075 A1 *    9/2010    ........... D06N 7/0002
(Continued)

OTHER PUBLICATIONS

Office Action from CN Application No. 201980033125.5 dated Jul. 26, 2022.
(Continued)

*Primary Examiner* — Lynda Salvatore
(74) *Attorney, Agent, or Firm* — Calfee, Halter & Griswold LLP

(57)    ABSTRACT

Disclosed herein is a binder system for nonwoven fiber mats that provides desirable properties to the nonwoven mat including desirable porosity, desirable surface properties e.g., desirable wettability and/or moisture resistance, and enhanced tensile strength. The system includes a two-part binder that includes (1) a formaldehyde-free carbohydrate-based binder and (2) a formaldehyde-free hydrophobic acrylic-based binder.

20 Claims, 2 Drawing Sheets

(51) Int. Cl.
*B32B 5/24* (2006.01)
*B32B 13/14* (2006.01)
*D04H 1/4218* (2012.01)
*D04H 1/64* (2012.01)
*E04C 2/04* (2006.01)
*E04C 2/20* (2006.01)

(52) U.S. Cl.
CPC .......... *D04H 1/4218* (2013.01); *D04H 1/641* (2013.01); *E04C 2/043* (2013.01); *E04C 2/205* (2013.01)

(58) Field of Classification Search
CPC .... B32B 2266/0271; B32B 2266/0278; B32B 5/022; B32B 5/245; D04H 1/4218; D04H 1/587; D04H 1/64; D04H 1/641; E04C 2/043; E04C 2/205
See application file for complete search history.

(56) References Cited

U.S. PATENT DOCUMENTS

| | | | |
|---|---|---|---|
| 5,747,392 A | 5/1998 | Xiao et al. | |
| 6,692,603 B1 | 2/2004 | Lindsay et al. | |
| 6,878,321 B2 | 4/2005 | Hauber et al. | |
| 7,837,009 B2 | 11/2010 | Gross et al. | |
| 8,193,107 B2 | 6/2012 | Tutin et al. | |
| 8,372,900 B2 | 2/2013 | Shooshtari et al. | |
| 8,377,564 B2 | 2/2013 | Shooshtari et al. | |
| 8,501,838 B2 | 8/2013 | Jackson et al. | |
| 8,591,642 B2 | 11/2013 | Hansen | |
| 8,651,285 B2 | 2/2014 | Shooshtari et al. | |
| 8,708,162 B2 | 4/2014 | Shooshtari et al. | |
| 8,791,198 B2 | 7/2014 | Miller et al. | |
| 8,834,980 B2 | 9/2014 | Hepworth et al. | |
| 8,864,893 B2 * | 10/2014 | Hawkins | C08K 3/32 106/206.1 |
| 8,940,854 B2 | 1/2015 | Eckert et al. | |
| 9,034,952 B2 | 5/2015 | Shooshtari et al. | |
| 9,193,867 B2 | 11/2015 | Finch et al. | |
| 9,242,899 B2 | 1/2016 | Castro-Cabado et al. | |
| 9,340,458 B2 | 5/2016 | Kampalli et al. | |
| 9,365,963 B2 | 6/2016 | Shooshtari | |
| 9,410,052 B2 | 8/2016 | Alavi et al. | |
| 9,469,766 B2 | 10/2016 | Hansen | |
| 9,604,878 B2 | 3/2017 | Christensen et al. | |
| 9,609,813 B2 | 4/2017 | Naerum et al. | |
| 2003/0032351 A1 * | 2/2003 | Horner, Jr. | D04H 1/68 442/373 |
| 2003/0236043 A1 | 12/2003 | Calzavara et al. | |
| 2004/0142618 A1 | 7/2004 | Porter | |
| 2006/0036014 A1 | 2/2006 | Hogan et al. | |
| 2010/0040832 A1 | 2/2010 | Herbert | |
| 2012/0156954 A1 | 6/2012 | Eckert et al. | |
| 2013/0157030 A1 | 6/2013 | Frick et al. | |
| 2014/0134497 A1 | 5/2014 | Lester et al. | |
| 2014/0135430 A1 | 5/2014 | Naerum et al. | |
| 2015/0133015 A1 | 5/2015 | Cano Carrasquilla et al. | |
| 2015/0291857 A1 | 10/2015 | Saha | |
| 2015/0306739 A1 | 10/2015 | Vervacke | |
| 2016/0304736 A1 | 10/2016 | Alavi et al. | |
| 2016/0312941 A1 | 10/2016 | Alavi et al. | |
| 2017/0022103 A1 | 1/2017 | Hansen | |
| 2017/0022398 A1 | 1/2017 | Ochel, Jr. et al. | |

FOREIGN PATENT DOCUMENTS

| | | |
|---|---|---|
| EP | 2230075 A1 | 9/2010 |
| EP | 3148951 B1 | 8/2019 |
| JP | 2005299013 A | 10/2005 |
| WO | 9746750 A1 | 12/1997 |
| WO | 2011044490 A1 | 4/2011 |
| WO | 2012122099 A2 | 9/2012 |
| WO | 2015181458 A1 | 12/2015 |
| WO | 2016055128 A1 | 4/2016 |
| WO | 2017036838 A1 | 3/2017 |
| WO | 2017036839 A1 | 3/2017 |

OTHER PUBLICATIONS

Examination Report from IN Application No. 202037051652 dated Jul. 18, 2022.
Office Action from CN Application No. 201980033125.5 dated Mar. 8, 2022.
International Search Report and Written Opinion from PCT/US2019/027580 dated Jul. 10, 2019.
Anonymous: "Hycar FF 26921 Acrylic Emulsion," pp. 1-2, retrieved from the Internet: URL: https://www.lubrizol.com/Coatings/Products/Hycar-FF-26921, retrieved on Jun. 21, 2019.

* cited by examiner

NONWOVEN WITH TWO-PART BINDER SYSTEM

CROSS-REFERENCE TO RELATED APPLICATIONS

This application is the U.S. national stage entry of PCT/US2019/027580, filed on Apr. 16, 2019, which claims priority to and any benefit of U.S. Provisional Patent Application No. 62/673,374, filed May 18, 2018, the contents of which are incorporated herein by reference in their entireties.

FIELD

The present disclosure relates to a two-part binder system for nonwoven fiber mats, particularly nonwoven fiber mats used as a facer in construction boards or materials. The two-part binder system of the present disclosure provides desirable properties to the nonwoven mat including desirable porosity, desirable surface properties e.g., desirable wettability and/or moisture resistance, and enhanced tensile strength.

BACKGROUND

Rigid polymeric foam insulation boards have been used for many years by the construction industry. Uses include commercial roof insulation boards utilized under asphaltic built-up roof (BUR) membranes as well as under various single ply membranes such as EPDM rubber, PVC, modified bitumen membranes and the like. Other uses include residential insulation, as sheathing under siding, and as roof insulation under asphalt shingles and concrete tiles.

Such insulation often takes the form of a core polymeric foamed thermoset material such as polyurethane, polyisocyanurate, polyurethane modified polyisocyanurate (often referred to as polyiso) or phenolic resin, applied between two facing sheets.

These insulation boards are generally manufactured on production lines where a liquid core chemical mixture is poured over a bottom facer, foaming up to contact a top facer in a constrained rise laminator. The reaction of the chemical mixture causing foaming is generally exothermic, as curing via polymerization and crosslinking occurs in the laminator. In the case of polyisocyanurate insulation boards, the curing exotherm can last well into the time the resulting rigid boards are cut, stacked and warehoused.

Traditionally, facer materials have included, among others, nonwoven fiber (e.g., fiberglass) mats, including nonwoven fiberglass mats coated with binder coatings. However, conventional nonwoven fiberglass mats are subject to excessive bleed-through of the foamable core composition due to the significant inherent porosity associated with the mats.

Nonwoven fiber mats generally comprise randomly matted glass fibers bonded together by a cured thermoset or dried thermoplastic polymeric binder. The processes for forming such mats are generally well known, including for example, the well-known wet-laid processing and dry-laid processing methods. One exemplary wet-laid process for forming nonwoven fiber mats, specifically nonwoven glass fiber mats, is shown in FIG. 1. Chopped glass fibers (110) may be provided to a conveying apparatus such as a conveyor (112) by a storage container (114) for conveyance to a mixing tank (116) that may contain the white water (e.g., various surfactants, viscosity modifiers, defoaming agents, and/or other chemical agents) with agitation to disperse the fibers and form a chopped glass fiber slurry (not shown). The glass fiber slurry may be transferred to a head box (118) where the slurry is deposited onto a conveying apparatus such as a moving screen or foraminous conveyor (120), and a substantial portion of the water from the slurry is removed to form a web (mat) (122) of enmeshed fibers. The water may be removed from the web (122) by a conventional vacuum or air suction system (not shown).

A binder (124) is then applied to the web (122) by a suitable binder applicator, such as the spray applicator (126) or a curtain coater (not illustrated). Once the binder (124) has been applied to the mat (122), the binder coated mat (128) is passed through at least one drying oven (130) to remove any remaining water and cure the binder composition (124). The formed non-woven fiber mat (132) that emerges from the oven (130) is an assembly of randomly oriented, dispersed, individual glass fibers. The fiber mat (132) may be rolled onto a take-up roll (134) for storage or later use as illustrated.

A dry-laid process is a process in which fibers are chopped and air blown onto a conveyor, after which a binder is then applied and cured to form the mat.

Thermoset polymeric binders useful in nonwoven fiber mats generally require a low viscosity in the uncured state, yet are able to form a semi-rigid or rigid mat for the fibers when cured. Historically, formaldehyde-based binder compositions were commonly used in the industry. However, attempts were made to reduce undesirable formaldehyde emissions from formaldehyde-based binder resins, including for example, adding urea as a formaldehyde scavenger to formaldehyde-based resins in an attempt to reduce formaldehyde emission from the fiberglass product.

More recently, formaldehyde-free binders have been employed as preferred alternatives to the formaldehyde-based binders. Exemplary examples of such formaldehyde-free binders are binders comprising, inter alia, a carbohydrate and a crosslinking agent. Such binders are free of added formaldehyde and are environmentally friendly, i.e., "green."

However, nonwoven fiber mats formed using such carbohydrate-based binders may lack certain desired performance or properties, as they may undesirably be too porous to be successfully used as facer substrates, incompatible with the desired facer coating, and susceptible to moisture absorption.

SUMMARY

Disclosed herein is a binder system for nonwoven fiber mats that provides desirable properties to the nonwoven mat including desirable porosity, desirable surface properties e.g., desirable wettability and/or moisture resistance, and enhanced tensile strength. The system includes a two-part binder that includes (1) a formaldehyde-free carbohydrate-based binder and (2) a formaldehyde-free hydrophobic acrylic-based binder. The two-part binder system of the present disclosure exhibits desirable porosity, desirable surface properties e.g., desirable wettability and/or moisture resistance, and enhanced tensile strength as compared to a comparable formaldehyde-free acrylic binder system alone (without the first part carbohydrate-based binder component).

Also disclosed herein is a nonwoven fiber mat comprising randomly oriented fibers and a two-part binder system applied to at least a portion of the randomly oriented fibers, wherein the binder system comprises a formaldehyde-free carbohydrate-based binder and a formaldehyde-free hydrophobic acrylic-based binder. When the mat has a basis weight of about 0.015 lb/ft² (about 75 grams per square meter or gsm) and about 20% by weight solids of the two-part binder system based on the total weight of the nonwoven fiber mat, the mat has a Frazier permeability of about 650 to about 715 cubic foot per min or CFM (about 18.4 to about 20.2 m³/min).

Also disclosed herein is a facer for a construction board comprising a nonwoven fiber mat of the present disclosure and a facer coating applied to at least a portion of the nonwoven fiber mat. When the facer has a weight of about 0.065 lb/ft² (about 317 gsm) and about 25% by weight solids of the two-part binder system and facer coating based on the total weight of the facer, the facer has an average Gurley gas permeability of about 1400 s to about 2150 s.

Also disclosed herein are construction boards. In exemplary embodiments, the construction boards include a foam insulation board comprising at least one facer disclosed herein disposed adjacent to a foam core. In exemplary embodiments, the foam insulation boards disclosed herein comprise a foam core disposed between at least two facers. In exemplary embodiments, the construction boards include a gypsum board comprising at least one facer disposed adjacent to a gypsum core. In exemplary embodiments, the gypsum boards disclosed herein comprise a gypsum core disposed between at least two facers.

BRIEF DESCRIPTION OF THE FIGURES

FIG. 3's image is shown with the same scale as FIG. 2.

DETAILED DESCRIPTION

Figure 1:
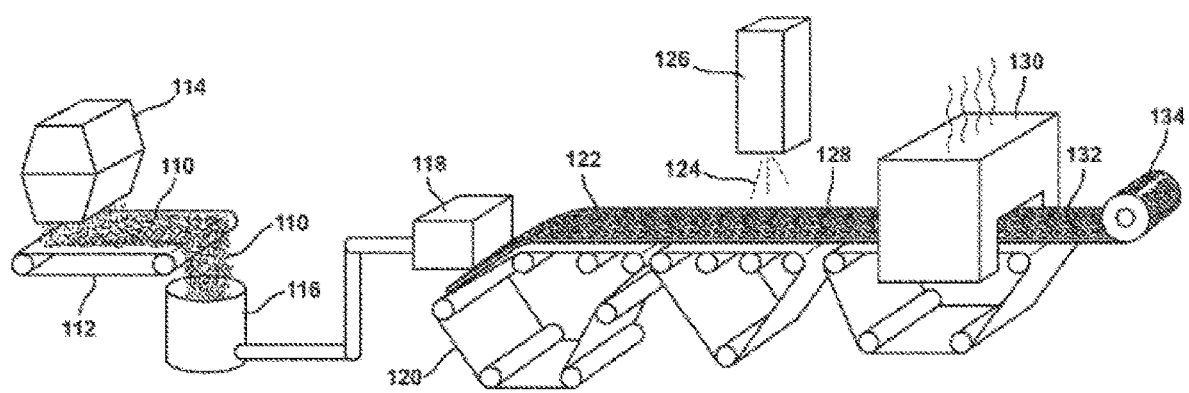
FIG. 1 shows an exemplary wet-laid process for forming nonwoven fiber mats.

Unless otherwise indicated herein, the term "wettable" generally refers to a hydrophilic surface, which may be understood as a surface with a water contact angle of less than 90°.

Unless otherwise indicated herein, the term "wettability" refers to the relative hydrophilicity of a surface, where a surface with more "wettability" is relatively more hydrophilic than another surface, or in other words, a surface with a lower water contact angle than that other surface. Thus, it should be understood that increasing the "wettability" of the surface increases the hydrophilicity of the surface (i.e., lowers the water contact angle). Conversely, reducing the "wettability" of the surface reduces the hydrophilicity (i.e., increases the water contact angle) and/or increases the hydrophobicity of the surface.

Unless otherwise indicated herein, tensile strength is measured with an Instron machine using a 2 inch (50 mm)×10 inch (254 mm) coupon sample taken from the appropriate direction of the subject material (machine or cross). As such, all tensile strengths reported herein represent the force per 2 inch length (50 mm) of the coupon and is reported as such (e.g., an example tensile strength reported herein is 100 lbf/2 inch or 444.8 N/50 mm).

As discussed above, nonwoven fiber mats may lack certain desired performance or properties, as they may undesirably be too porous to be successfully used as facer substrates and/or they may be incompatible with the desired facer coating (e.g., due to surface properties such as wettability).

The binder system of the present disclosure solves these problems with a two-part binder. The first part of the binder system is a formaldehyde-free carbohydrate-based binder. The second part of the two-part binder system is a formaldehyde-free hydrophobic acrylic-based binder.

Carbohydrates are generally hydrophilic. As such, a carbohydrate-based binder, including but not limited to the first part of the binder system disclosed herein, generally attracts water and, when cured or dried in the nonwoven mat, increases the relative wettability of the surface and/or provides a surface with a relatively high wettability. With a high wettability, the surface is more susceptible to moisture absorption and issues related to moisture absorption (e.g., deteriorating physical properties, microbial growth, etc.). Furthermore, a binder surface having relatively high wettability may provide a poor substrate for certain coatings, including the facer coatings of the present disclosure, due to poor compatibility and/or poor adhesion with such coatings. For highly-wettable surface such as a carbohydrate-based binder, including but not limited to the first part of the binder system disclosed herein, the facer coating will quickly wet and penetrate through the mat, i.e., bleed through, thereby not being able to form a substantially continuous coating over the outer surface of the mat. Instead the mat is an impregnated composite following the bleed-through of the coating and is not effective nor particularly useful as a facer for a construction board.

The two-part binder system of the present disclosure addresses these issues by modifying the surface properties of the cured/dried binder on the nonwoven fiber mat by applying a hydrophobic acrylic-based binder over the carbohydrate-based binder. The hydrophobic acrylic-based binder (the second part of the two-part binder system) encapsulates, or at least partially encapsulates, the carbohydrate-based binder (the first part of the two-part binder system) on the nonwoven fiber mat. As discussed below, this is done in a manner in which the acrylic-based binder substantially or completely impregnates the nonwoven fiber mat after the first part carbohydrate-based binder is applied to the mat.

Figure 2:
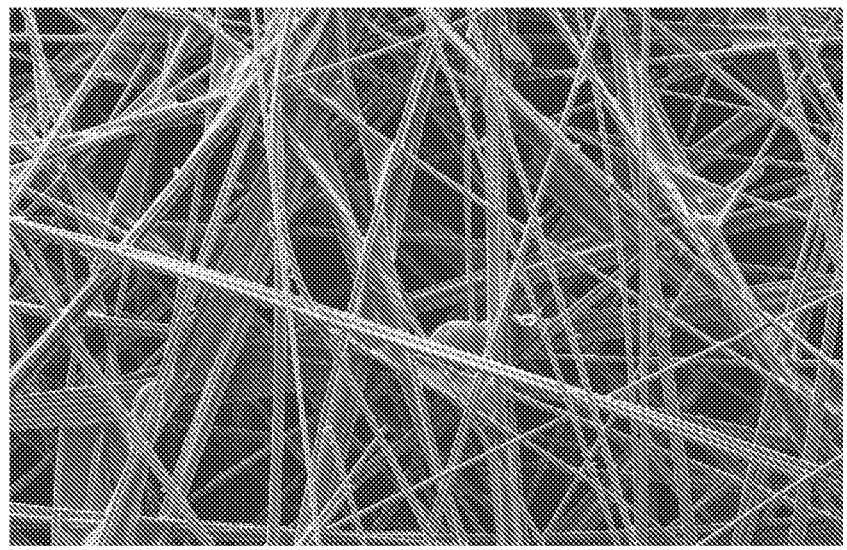
FIG. 2 shows a scanning electron microscope (SEM) image of a nonwoven mat formed using only an acrylic-based binder in accordance with the second-part, hydrophobic acrylic-based binder of the present disclosure.
Figure 3:
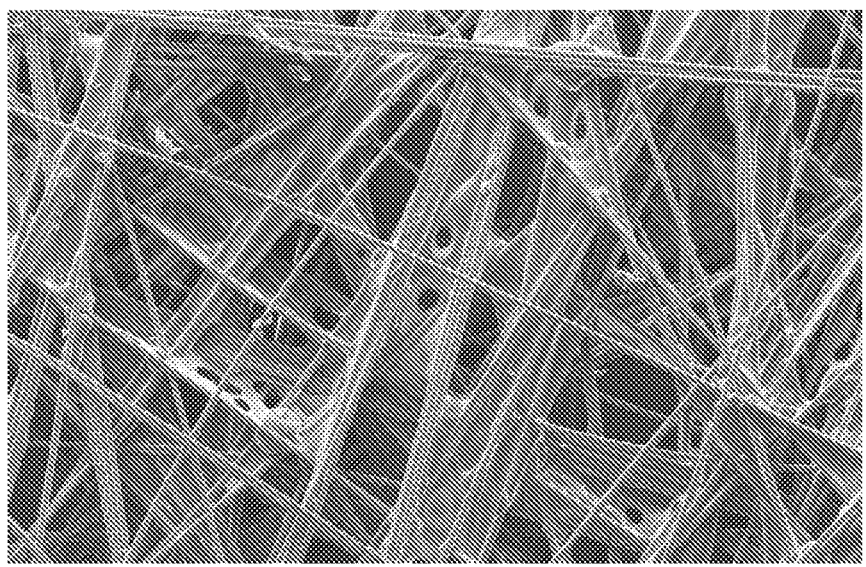
FIG. 3 shows a SEM image a nonwoven mat formed using only a carbohydrate-based binder at the same basis weight, same glass content, and same amount of binder of the nonwoven mat of FIG. 2 (where the carbohydrate-based binder shown in FIG. 3 is in accordance with the first part of the two-part binder system disclosed herein).

As a result, this particular combination and arrangement of the two-part binder system on the nonwoven fiber mats successfully modifies the surface properties of the nonwoven fiber mat so as to provide an enhanced substrate for a facer coating. First, the use of the first part carbohydrate-based binder reduces the porosity of the nonwoven mat. This is illustrated by FIGS. 2 and 3. FIGS. 2 and 3, show scanning electron microscope images of comparable nonwoven mats (i.e., identical except for the binder). FIGS. 2 and 3, which were both obtained from the same ZEISS SEM at the same scale, each have an electron high tension (EHT) value of 15.00 kV and a working distance (WD) of 12.0 mm. FIG. 2 shows a nonwoven glass fiber mat formed using an acrylic-based binder, and FIG. 3 shows a nonwoven glass fiber mat formed using a carbohydrate-based binder. FIG. 3 shows a more complete coverage of the carbohydrate-based binder on the fibers, including more "webbing" of the binder between proximate fibers than the acrylic-based binder of FIG. 2. This increased coverage resulting from the carbohydrate binder occupies more space in the mat, thereby lowering the porosity of the mat. This is important because, as shown in FIGS. 2 and 3, a lower porosity generally provides more surface area for the facer coating to adhere to when being applied to the nonwoven fiber mat. However, while, the carbohydrate-based binder in accordance with the present disclosure reduces the porosity of the nonwoven mat, the hydrophilicity of the carbohydrate-based binder on the mat provides a poor substrate for certain coatings, including the facer coatings of the present disclosure. This is remedied by the application of the second part, hydrophobic acrylic-based binder of the binder system of this disclosure.

Specifically, the encapsulation of the first part carbohydrate-based binder with the second part hydrophobic-based acrylic binder of the present disclosure changes the surface properties of the nonwoven mat and provides an excellent substrate for the facer coatings of the present disclosure. It should be understood that the nonwoven fiber mats of the present disclosure have a reduced wettability, at least as compared to a comparable nonwoven fiber mat prepared using a carbohydrate binder system alone (without the second part hydrophobic acrylic-based binder component). For example, the dynamic water contact angle (measured using a contact angle goniometer) of a nonwoven glass mat having the two-part binder prepared according to Example 1 is about 120 or greater while the comparable nonwoven fiber mat prepared using a carbohydrate binder system alone (without the second part hydrophobic acrylic-based binder component) has a water contact angle less than 120°, and includes from 0° to less than 120°. When used as a substrate for a facer, the mats having a surface with a reduced wettability provide better adhesion for the facer coatings disclosed herein. Thus, the mats having a surface with a reduced porosity and a reduced wettability due to the particular combination and arrangement of the two-part binder system of the present disclosure provide better substrates for the facer coatings of the present disclosure.

The porosity of the nonwoven fiber mats of the present disclosure is characterized by the Frazier permeability of the mat. The Frazier permeability, which is a measure of the air permeability drawn through the mat (in accordance with ASTM D737), is a representation of how porous the mat is. A more porous mat is generally more permeable to air, and vice versa, a less porous mat is less permeable to air. Thus, a lower permeability according to the present disclosure represents a lower porosity of the mat. The lower porosity, as discussed above, provides for a more desirable substrate for a facer. In the Frazier permeability test, a sample of the nonwoven mat is suspended in a chamber through which is passed air at about 70° F. and about 65% relative humidity. The tests are performed under a pressure of 125 Pa. Unless otherwise indicated herein, the Frazier permeability tests were performed on TexTest Instruments of Zurich, Switzerland, Model FX3300. The resulting reading on the test gives the cubic feet per minute of air which can pass through each square foot of the mat.

The nonwoven fiber mats formed using the two-part binder system of the present disclosure, when the mat has a basis weight of about 0.015 lb/ft$^2$ (about 75 gsm) and about 20% by weight solids of the two-part binder system based on the total weight of the nonwoven fiber mat, has a Frazier permeability of about 650 to about 715 CFM (about 18.4 to about 20.2 m$^3$/min). In certain embodiments, when the mat has a basis weight of about 0.015 lb/ft$^2$ (about 75 gsm) and about 20% by weight solids of the two-part binder system based on the total weight of the nonwoven fiber mat, the nonwoven fiber mat of the present disclosure has a Frazier permeability of about 690 to about 710 CFM (about 19.5 to about 20.1 m$^3$/min).

In addition, it should be understood that the less wettable nonwoven fiber mats of the present disclosure have an enhanced resistance to moisture. This resistance to moisture is shown by reduced moisture absorption, at least as compared to a comparable nonwoven fiber mat prepared using a formaldehyde-free acrylic binder system alone (same basis weight and percent solids but without the first part carbohydrate-based binder component). As shown in Example 3, a comparable mat formed with the two-part binder system of the present disclosure has a lower average moisture content (0.5%) as compared to a comparable nonwoven fiber mat prepared using a formaldehyde-free acrylic binder system alone (1.0%). Notably, although the surfaces of both mats have the same hydrophobic binder composition and thus one would expect similar moisture resistance, as mentioned above, the nonwoven mat with the particular combination and arrangement of the two-part binder system of the present disclosure unexpectedly absorbs less moisture and therefore demonstrates a higher resistance to moisture. Without intending to be limited by any theory, it may be that the reduced porosity of the nonwoven mat formed with the two-part binder system of the present disclosure in combination with the acrylic binder layer helps reduce the moisture absorption associated with the precursor mat.

In accordance with certain embodiments, the nonwoven mats of the present disclosure also exhibit enhanced tensile strength at least as compared to a comparable nonwoven fiber mat prepared using a formaldehyde-free acrylic binder system alone (same basis weight and percent solids but without the first part carbohydrate-based binder component). As shown in Example 3, a comparable mat formed with the two-part binder system of the present disclosure has a higher average machine direction tensile strength (about 264 N/50 mm or about 59.3 lbf/2 inch) as compared to a comparable nonwoven fiber mat prepared using a formaldehyde-free acrylic binder system alone (about 238 N/50 mm or about 53.5 lbf/2 inch). Again, the particular combination and arrangement of the two-part binder system of the present disclosure unexpectedly provides enhanced tensile properties over comparable mats.

Furthermore, being free of added formaldehyde, the two-part binder system has the benefit of having reduced VOC emissions.

First-Part: Formaldehyde-Free Carbohydrate-Based Binder

With regard to the first part of the two-part binder, the formaldehyde-free carbohydrate-based binder is a thermoset binder that comprises, among other things, a carbohydrate and a crosslinking agent. Such binders may also include typical additives used in binder compositions including, but not limited to, a coupling agent, a biocide, a process aid agent, an extender, a pH adjuster, a catalyst, a crosslinking density enhancer, a deodorant, an antioxidant, a dust suppressing agent, a defoaming agent, a moisture resistant agent, and combinations thereof.

The carbohydrates are typically polysaccharides having a dextrose equivalence (DE) from 2 to 20, from 7 to 17, and/or from 9 to 14. Suitable polysaccharides include, but are not limited to, water-soluble polysaccharides such as maltodextrin, pectin, dextrin, starch, modified starch, starch derivatives, and combinations thereof. The polysaccharide carbohydrate may have a number average molecular weight from about 1,000 to about 8,000. The carbohydrates beneficially have a low viscosity and cure at moderate temperatures (e.g., 80-250° C.) alone or with additives. The low viscosity enables the carbohydrate to be utilized in a binder composition. In exemplary embodiments, the viscosity of the carbohydrate may be lower than 500 cps at 50% concentration and between 20 and 30° C. In at least one exemplary embodiment, the carbohydrate is a water-soluble polysaccharide such as dextrin or maltodextrin with a DE from 2 to 20.

In addition to being free of formaldehyde emissions, the use of a carbohydrate may be considered "green" in the sense that it is a bio-based component derived from renewable resources. Accordingly, the use of a carbohydrate-based binder composition is advantageous in that carbohydrates are readily available or easily obtainable and are low in cost.

The carbohydrate component comprises from about 30% to about 60% by weight of the total solids in the carbohydrate-based binder composition, including from about 40% to about 50% by weight of the total solids in the carbohydrate-based binder composition.

Examples of a suitable commercially available carbohydrates include MD 1909, a maltodextrin with a DE of 10 to 13, and MD 1956 with a DE of 5 to 8, both of which are available from Cargill (Minneapolis, Minn.).

The carbohydrate-based binder composition includes a crosslinking agent. The crosslinking agent may be any compound suitable for crosslinking the carbohydrate. In exemplary embodiments, the crosslinking agent has a number average molecular weight greater than 90, from about 90 to about 10,000, or from about 190 to about 4,000. In some exemplary embodiments, the crosslinking agent has a number average molecular weight less than about 1000.

Suitable crosslinking agents include, but are not limited to, polycarboxylic acids, salts of polycarboxylic acid, anhydrides, monomeric and polymeric polycarboxylic acids with anhydride, citric acid, salts of citric acid, adipic acid, salts of adipic acid, polyacrylic acids, salts of polyacrylic acid, polyacrylic acid based resins, and/or combinations thereof.

The crosslinking agent is present in the binder composition in an amount from about 40% to about 70% by weight of the total solids in the carbohydrate-based binder composition, including from about 50% to about 60% by weight of the total solids in the carbohydrate-based binder composition.

Examples of suitable preferred commercially available crosslinking agents are ACUMER 4161, a phosphinopolycarboxylic acid (i.e., a phosphonate polyacrylate); ACUMER 9932, a polyacrylic acid with a molecular weight of about 4000 and containing sodium hypophosphite; AQUASET 100 a thermosetting acrylic solution polymer, all of which are available from The Dow Chemical Company (Midland, Mich.); and ACRODUR 950L, a crosslinking acrylate resin, available from BASF (Ludwigshafen, Germany).

The carbohydrate-based binder composition may optionally include at least one coupling agent such as a silane coupling agent.

Examples of suitable silane coupling agents that may be used in the binder composition, include may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., γ-aminopropyltriethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes.

Examples of specific coupling agents, including silane coupling agents, suitable for use in the binder compositions disclosed herein are set forth below:

Acryl: 3-acryloxypropyltrimethoxysilane; 3-acryloxypropyltriethoxysilane; 3-acryloxypropylmethyldimethoxysilane; 3-acryloxypropylmethyldiethoxysilane; 3-methacryloxypropyltrimethoxysilane; 3-methacryloxypropyltriethoxysilane;

Amino: aminopropylmethyldimethoxysilane; aminopropyltriethoxysilane; aminopropyltrimethoxysilane/EtOH; aminopropyltrimethoxysilane; N-(2-aminoethyl)-3-aminopropyltrimethoxysilane; N-(2-aminoethyl)-3-aminopropylmethyldimethoxysilane; (2-aminoethyl)-(2-aminoethyl) 3-aminopropyltrimethoxysilane; N-phenylaminopropyltrimethoxysilane;

Epoxy: 3-Glycidoxypropylmethyldiethoxysilane; 3-glycidoxypropylmethyldimethoxysilane; 3-glycidoxypropyltriethoxysilane; coxycyclohexyl)ethylmethyldimethoxysilane; 2-(3,4-epoxycyclohexyl) ethylmethyldiethoxysilane; 2-(3,4-epoxycyclohexyl) ethyltrimethoxysilane; 2-(3,4-Epoxycyclohexyl) ethyltriethoxysilane;

Mercapto: 3-mercaptopropyltrimethoxysilane; 3-Mercaptopropyltriethoxysilane; 3-mercaptopropylmethyldimethoxysilane; 3-Mercaptopropylmethyldiethoxysilane;

Sulfide: bis[3-(triethoxysilyl)propyl]-tetrasulfide; bis[3-(triethoxysilyl)propyl]-disulfide;

Vinyl: vinyltrimethoxysilane; vinyltriethoxysilane; vinyl tris(2-methoxyethoxy)silane; vinyltrichlorosilane; trimethylvinylsilane;

Alkyl: methyltrimethoxysilane; methyltriethoxysilane; dimethyldimethoxysilane; dimethyldiethoxysilane; tetramethoxysilane; tetraethoxysilane; ethyltriethoxysilane; n-propyltrimethoxysilane; n-propyltriethoxysilane; isobutyltrimethoxysilane; hexyltrimethoxysilane; hexyltriethoxysilane; octyltrimethoxysilane; decyltrimethoxysilane; decyltriethoxysilane; octyltriethoxysilane; tert-butyldimethylchlorosilane; cyclohexylmethyldimethoxysilane; dicylohexyldimethoxysilane; cyclohexylethyldimethoxysilane; t-butylmethyldimethoxysilane;

Chloroalkyl: 3-chloropropyltriethoxysilane; 3-chloropropyltrimethoxysilane; 3-chloropropylmethyldimethoxysilane;

Perfluoro: decafluoro-1,1,2,2-tetrahydrodecyl)trimethoxysilane; ((heptadecafluoro-1,1,2,2-tetrahydrodecyl) trimethoxysilane;

Phenyl: phenyltrimethoxysilane; phenyltriethoxysilane; diphenyldiethoxysilane; diphenyldimethoxysilane; diphenyldichlorosilane;

Hydrolyzates of the silanes listed above;

Zirconates: zirconium acetylacetonate; zirconium methacrylate; and

Titanates: tetra-methyl titanate; tetra-ethyl titanate; tetra-n-propyl titanate; tetra-isopropyl titanate; tetra-isobutyl titanate; tetra-sec-butyl titanate; tetra-tert-butyl titanate; mono n-butyl, trimethyl titanate; mono ethyl tricyclohexyl titanate; tetra-n-amyl titanate; tetra-n-hexyl titanate; tetra-cyclopentyl titanate; tetra-cyclohexyl titanate; tetra-n-decyl titanate; tetra n-dodecyl titanate; tetra (2-ethyl hexyl) titanate; tetra octylene glycol titanate ester; tetrapropylene glycol titanate ester; tetra benzyl titanate; tetra-p-chloro benzyl titanate; tetra 2-chloroethyl titanate; tetra 2-bromoethyl titanate; tetra 2-methoxyethyl titanate; tetra 2-ethoxyethyl titanate.

The coupling agent may be present in the carbohydrate-based binder composition in an amount from about 0 to about 5% by weight of the total solids in the carbohydrate-based binder composition, including from about 0.01% to about 5% and from about 0.1% to about 1% by weight of the total solids in the carbohydrate-based binder composition.

An example of a suitable exemplary commercially available coupling agent is SILQUEST A-1100 γ-aminopropyltriethoxysilane available from Momentive Performance Materials (Waterford, N.Y.).

A biocide such as 3-iodo-2propyl-n-butylcarbamate, carbamic acid, butyl-, 3-iodo-2-propynyl ester (IPBC), 2-bromo-2-nitropropane-1,3-diol, magnesium nitrate, 5-chloro-2-methyl-4-isothiazolin-3-one, magnesium chloride, sulfamic acid, N-bromo, sodium salt, diiodomethyl-p-tolysulfone, dibromoacetonitrile, and 2,2-dibromo-3-nitrilopropionamide may be included in the binder composition to reduce or eliminate mold and fungal growth on the fiber product. The biocide may be present in the binder composition in an amount from about 0 to about 0.5% by weight of the total solids in the carbohydrate-based binder composition, including from 0.05% to about 0.15% by weight of the total solids in the carbohydrate-based binder composition.

Examples suitable preferred commercially available biocides are POLYPHASE 663, a composition based on n-(3, 4-dichlorophenyl)-n,n-dimethylurea and different carbamates, available from Troy Corporation (Concord, Ontario, Canada), POLYPHASE 604 also available from Troy Corporation, and Dow Chemical's Amical Flowable, a diiodomethyl-p-tolysulfone.

Additives such as a process aid agent, a corrosion inhibitor, an extender, a pH adjuster, a catalyst, and a crosslinking density enhancer may be used in the carbohydrate-based binder of the present disclosure.

The optional process aid agent is not particularly limiting so long as the process aid functions to facilitate the processing of the fibers formation and orientation. The process aid can be used to improve binder application distribution uniformity, to reduce binder viscosity, to improve the vertical weight distribution uniformity, and/or to accelerate binder de-watering in both forming and oven curing process. The process aid agent may be present in the binder composition in an amount from about 0% to about 25% by weight, including from about 1% to about 20% by weight and from about 5% to about 15% by weight of the total solids in the carbohydrate-based binder composition.

Examples of processing aid agents include viscosity modifiers, e.g., glycerol, 1,2,4-butanetriol, 1,4-butanediol, 1,2-propanediol, 1,3-propanediol, poly(ethylene glycol), and defoaming agents, e.g., emulsions and/or dispersions of mineral, paraffin, or vegetable oils, dispersions of polydimethylsiloxane (PDMS) fluids and silica which has been hydrophobized with polydimethylsiloxane or other materials, and particles made of amide waxes such as ethylenebisstearamide (EBS) or hydrophobized silica. A further process aid agent that may be utilized in the carbohydrate-based binder composition is a surfactant. One or more surfactant may be included in the composition to assist in binder atomization, wetting, and interfacial adhesion.

Examples of suitable surfactants are not particularly limited, and includes surfactants such as, but not limited to, ionic surfactants, e.g., sulfate, sulfonate, phosphate, and carboxylate; sulfates, e.g., alkyl sulfates, ammonium lauryl sulfate, sodium lauryl sulfate (SDS), alkyl ether sulfates, sodium laureth sulfate, and sodium myreth sulfate; amphoteric surfactants, e.g., alkylbetaines such as lauryl-betaine; sulfonates, e.g., dioctyl sodium sulfosuccinate, perfluorooctanesulfonate, perfluorobutanesulfonate, and alkyl benzene sulfonates; phosphates, e.g., alkyl aryl ether phosphate and alkyl ether phosphate; carboxylates, e.g., alkyl carboxylates, fatty acid salts (soaps), sodium stearate, sodium lauroyl sarcosinate, carboxylate fluorosurfactants, perfluoronanoate, and perfluorooctanoate; cationic surfactants, e.g., alkylamine salts such as laurylamine acetate; pH dependent surfactants, e.g., primary, secondary or tertiary amines; permanently charged quaternary ammonium cations, e.g., alkyltrimethylammonium salts, cetyl trimethylammonium bromide, cetyl trimethylammonium chloride, cetylpyridinium chloride, and benzethonium chloride; zwitterionic surfactants; and quaternary ammonium salts, e.g., lauryl trimethyl ammonium chloride and alkyl benzyl dimethylammonium chloride, and polyoxyethylenealkylamines.

Suitable nonionic surfactants that can be used in conjunction with the carbohydrate-based binder composition of the present disclosure include polyethers, e.g., ethylene oxide and propylene oxide condensates, which include straight and branched chain alkyl and alkaryl polyethylene glycol and polypropylene glycol ethers and thioethers; alkylphenoxypoly(ethyleneoxy)ethanols having alkyl groups containing from about 7 to about 18 carbon atoms and having from about 4 to about 240 ethyleneoxy units, e.g., heptylphenoxypoly(ethyleneoxy) ethanols, and nonylphenoxypoly(ethyleneoxy) ethanols; polyoxyalkylene derivatives of hexitol including sorbitans, sorbides, mannitans, and mannides; partial long-chain fatty acids esters, e.g., polyoxyalkylene derivatives of sorbitan monolaurate, sorbitan monopalmitate, sorbitan monostearate, sorbitan tristearate, sorbitan monooleate, and sorbitan trioleate; condensates of ethylene oxide with a hydrophobic base, the base being formed by condensing propylene oxide with propylene glycol; sulfur containing condensates, e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms; ethylene oxide derivatives of long-chain carboxylic acids, e.g., lauric, myristic, palmitic, and oleic acids, such as tall oil fatty acids; ethylene oxide derivatives of long-chain alcohols, e.g., octyl, decyl, lauryl, or cetyl alcohols; and ethylene oxide/propylene oxide copolymers.

The surfactant may be present in the carbohydrate-based binder in an amount from 0 to about 10% by weight of the total solids in the carbohydrate-based binder composition, including from about 0.01% to about 10% by weight and from about 0.2% to about 5% by weight of the total solids in the carbohydrate-based binder composition.

The carbohydrate-based binder composition may optionally include a corrosion inhibitor as an additive to reduce or eliminate any potential corrosion to the process equipment. The corrosion inhibitor can be chosen from a variety of agents, such as, for example, hexamine, benzotriazole, phenylenediamine, dimethylethanolamine, polyaniline, sodium nitrite, benzotriazole, dimethylethanolamine, polyaniline, sodium nitrite, cinnamaldehyde, condensation products of aldehydes and amines (imines), chromates, nitrites, phosphates, hydrazine, ascorbic acid, tin oxalate, tin chloride, tin sulfate, thiourea, zinc oxide, and nitrile. Alternatively, the corrosion can be reduced or eliminated by process control abatement, such as process water neutralization, removal of corrosive ingredients, and process water treatment to minimize the corrosivity. The corrosion inhibitor may be present in the carbohydrate-based binder composition in an amount from about 0% to about 15% by weight of the total solids in the carbohydrate-based binder composition, including from about 1% to about 5% by weight and from about 0.2% to about 1.0% by weight of the total solids in the carbohydrate-based binder composition.

The carbohydrate-based binder composition may optionally include at least one extender to improve the binder's appearance and/or to lower the overall manufacturing cost. The extender can be an inorganic filler, such as tin oxide or calcium carbonate or organic materials such as lignin, lignin sulfonate, or a protein-based biomass. In exemplary embodiments, the extender is a protein-containing biomass. Like the carbohydrate, the protein-containing biomass is natural in origin and is derived from renewable resources (i.e., "green"). For instance, the protein may be derived from plant sources such as soy (e.g., a soy flour), peanuts, sunflowers, kidney beans, walnuts, or from other plants that have a high protein content. Alternatively, the protein may come from animal sources such as, but not limited to, eggs, blood, and animal tissue (e.g., beef, pork, or chicken, as well as fish). The extender may be present in the binder composition in an amount from about 0% to about 70% by weight of the total solids in the carbohydrate-based binder composition, including from about 5% to about 50% by weight and from about 10% to about 40% by weight of the total solids in the carbohydrate-based binder composition.

The carbohydrate-based binder composition may optionally include a pH adjuster such as an organic and/or inorganic acid or base in an amount sufficient to adjust the pH to a desired level. The pH may be adjusted depending on the intended application, or to facilitate the compatibility of the ingredients of the binder composition. In exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a crosslinking agent. Optionally, organic and/or inorganic bases, such sodium hydroxide, ammonium hydroxide, and diethylamine, and any kind of primary, secondary, or tertiary amine (including alkanol amine), can be used for pH adjustment. The pH of the carbohydrate-based binder composition, when in an acidic state, may range from about 1 to about 6, and in some exemplary embodiments, from about 2 to about 5, including all amounts and ranges in between. In at least one exemplary embodiment, the pH of the binder composition is about 2.5.

Optionally, the carbohydrate-based binder composition may include a catalyst or cure accelerator to assist in the crosslinking. The catalyst may include inorganic salts, Lewis acids (i.e., aluminum chloride or boron trifluoride), Bronsted acids, e.g., sulfuric acid, p-toluenesulfonic acid and boric acid; organometallic complexes, e.g., lithium carboxylates, sodium carboxylates; and/or Lewis bases, e.g., polyethyleneimine, diethylamine, or triethylamine. Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexamethaphosphate, potassium phosphate, potassium tripolyphosphate, sodium trimetaphosphate, sodium tetramethaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst or cure accelerator. The catalyst or cure accelerator may be present in the carbohydrate-based binder composition in an amount from about 0% to about 10% by weight of the total solids in the carbohydrate-based binder composition, including from about 0.01% to about 5% by weight, and from about 3% to about 5% by weight of the total solids in the carbohydrate-based binder composition.

Further, the carbohydrate-based binder composition may optionally include at least one crosslinking density enhancer to improve the degree of crosslinking of the carbohydrate-based binder. Crosslinking density enhancement can be achieved by increasing esterification between the hydroxyl and carboxylic acid groups and/or introducing free radical linkages to improve the strength of the thermoset resin. The esterification crosslinking density can be adjusted by changing the ratio between hydroxyl and carboxylic acid and/or adding additional esterification functional groups such as triethanolamine, diethanolamine, mono ethanolamine, 1-amino-2-propanol, 1,1'-aminobis-2-propanol, 1,1',1"nitrilotri-2-propanol, 2-methylaminoethanol, 2-dimethylaminoethanol, 2-(2-aminoethoxy)ethanol, 2 {(2aminoethyl) amino}ethanol, 2-diethylaminoethanol, 2-butylaminoethanol, 2-dibutylaminoethanol, 2cyclohexylamincethanol, 2,2'-(methylamino)bis-ethanol, 2,2'-(butylamino)bis-ethanol, 1-methylamino-2propanol, 1-dimethylamino-2-propanol, 1-(2-aminoethylamino)-2-propanol, 1,1'-(methylimino)bis-2-propanol, 3-amino-1-propanol, 3-dimethylamino-1propanol, 2-amino-1-butanol, 1-ethylamino-2-butanol, 4-diethylamino-1-butanol, 1-diethylamino-2-butanol, 3-amino-2,2-dimethyl-1-propanol, 2,2-dimethyl-3-dimethylamino-1-propanol, 4-diethylamino-2-butyn-1-ol, 5-diethylamino-3-pentyne-2-ol, bis (2-hydroxypropyl)amine, as well as other alkanolamines, their mixtures, and their polymers. Another method to achieve crosslinking density enhancement is to use both esterification and free radical reaction for the crosslinking reactions. Chemicals that can be used for both reactions include maleic anhydride, maleic acid, or itaconic acid. The crosslinking density enhancer may be present in the carbohydrate-based binder composition in an amount from about 0% to about 25% by weight of the total solids in the carbohydrate-based binder composition, including from about 0.001% to about 20% by weight and from about 0.1% to about 5% by weight of the total solids in the carbohydrate-based binder composition.

Other additives that include a deodorant, an antioxidant, a dust suppressing agent, and a moisture resistant agent as described in U.S. Pat. No. 8,864,893 may be used in the carbohydrate-based binder of the present disclosure.

The carbohydrate-based binder also comprises water to dissolve or disperse the active solids for application onto the web of fibers that form the mat. Water may be added in an amount sufficient to dilute the binder composition to a viscosity that is suitable for its application to the reinforcement fibers and to achieve a desired solids content on the fibers.

Exemplary embodiments of the carbohydrate-based binder formulation are shown in the table below.

TABLE 1

| INGREDIENT | Formulation Weight % (solids) | Formulation Weight % (solids) | Formulation Weight % (solids) |
| --- | --- | --- | --- |
| polyacrylic acid (PAA) | 40-70 | 50-60 | 56.9 |
| maltodextrin | 30-60 | 40-50 | 42.5 |
| γ-aminopropyltriethoxysilane | 0-5 | 0.01-1 | 0.5 |
| biocide | 0-0.5 | 0.05-0.15 | 0.1 |

Second Part: Formaldehyde-Free Hydrophobic Acrylic-Based Binder

Following the application and drying/cure of the first-part of the binder system (the formaldehyde-free carbohydrate-based binder) on the non-woven fiber mat, the second-part of the binder, a formaldehyde-free hydrophobic acrylic-based binder, is applied to the mat and dried.

The acrylic-based binder is a thermoplastic binder containing acrylic and/or acrylonitrile functionality. This acrylic-based binder is applied as an aqueous emulsion or latex. As mentioned above, this acrylic-based binder component is hydrophobic and thus imparts hydrophobic properties to, or at least decreases the wettability of, the nonwoven mat containing the two-part binder system of the present disclosure. Furthermore, similar to the first-part of the binder composition, the acrylic-based second part is formaldehyde-free. The acrylic-based binder also has a glass transition temperature ($T_g$) greater than 20° C., including greater than 25° C. This relatively low glass transition temperature is believed to impart or at least contribute to the flexibility to the cured/dried nonwoven fiber mat.

Similar to the first-part of the binder composition, the second-part formaldehyde-free acrylic-based binder may include additives, including but not limited to, the additives listed herein with respect to the first-part carbohydrate-based of the binder composition except for catalysts or cure accelerators and crosslinking density enhancers. For example, a coupling agent may be present in the acrylic-based binder composition in an amount from about 0 to about 5% by weight of the total solids in the acrylic-based binder composition, including from about 0.01% to about 5% and from about 0.1% to about 1% by weight of the total solids in the acrylic-based binder composition. A biocide may be present in the binder composition in an amount from about 0 to about 0.5% by weight of the total solids in the acrylic-based binder composition, including from 0.05% to about 0.15% by weight of the total solids in the acrylic-based binder composition. A process aid agent may be included in the acrylic-based binder composition in an amount from about 0% to about 25% by weight, including from about 1% to about 20% by weight and from about 5% to about 15% by weight of the total solids in the acrylic-based binder composition. A surfactant may be present in the acrylic-based binder in an amount from 0 to about 10% by weight of the total solids in the acrylic-based binder composition, including from about 0.01% to about 10% by weight and from about 0.2% to about 5% by weight of the total solids in the acrylic-based binder composition. A corrosion inhibitor may be present in the acrylic-based binder composition in an amount from about 0% to about 15% by weight of the total solids in the acrylic-based binder composition, including from about 1% to about 5% by weight and from about 0.2% to about 5% by weight of the total solids in the acrylic-based binder composition. An extender may be present in the binder composition in an amount from about 0% to about 70% by weight of the total solids in the acrylic-based binder composition, including from about 5% to about 50% by weight and from about 10% to about 40% by weight of the total solids in the acrylic-based binder composition. The acrylic-based binder composition may optionally include a pH adjusters such as an organic and/or inorganic acid or base bases in an amount sufficient to adjust the pH to a desired level.

An example of a suitable preferred commercially available acrylic-based binder is HYCAR 26921, a formaldehyde free acrylic and acrylonitrile functional emulsion having a glass transition temperature ($T_g$) of about 29° C., available from Lubrizol (Manchester, UK).

Nonwoven Fiber Mat

The two-part binder system of the present disclosure is used to bind (i.e., "glue") the fibers of a nonwoven fiber mat together. The nonwoven fiber mats of the present disclosure are prepared in any conventional manner known in the art, including for example, wet-laid and dry-laid processes described above. The only exception is the application of the two-part binder in such processes. In particular, the formaldehyde-free carbohydrate-based binder (i.e., first-part of the two-part binder) is applied as described in the processes above. For example, in the wet-laid process shown in FIG. 1, the formaldehyde-free carbohydrate-based binder (124) is applied to the web (122) by a suitable binder applicator, such as the spray applicator (126) or a curtain coater (not illustrated). Subsequent to the application of the formaldehyde-free carbohydrate-based binder, the binder is cured using heat or any other suitable curing technique. In the dry-laid process, after the fibers are blown onto the conveyor, the first-part carbohydrate-based binder is applied via any suitable means, such as through a curtain coater and then cured using heat or any other suitable curing technique. According to any process for forming the nonwoven mats, after the first-part carbohydrate-based binder is cured, the second-part formaldehyde-free hydrophobic acrylic-based binder is applied, preferably via a bath or other form of impregnation station, and then dried using heat or any other suitable drying technique.

The nonwoven fiber mat comprises from about 5% to about 15% by weight solids of the first-part formaldehyde-free carbohydrate-based binder based on the total weight of the nonwoven fiber mat. The nonwoven fiber mat comprises from about 5% to about 15% by weight solids of the second-part formaldehyde-free acrylic-based binder based on the total weight of the nonwoven fiber mat. Overall, the nonwoven fiber mat comprises from about 10% to about 30% by weight solids of the two-part binder system based on the total weight of the nonwoven fiber mat, including from about 15% to about 25% by weight solids of the two-part binder system based on the total weight of the nonwoven fiber mat.

The nonwoven fiber mats of the present disclosure have a thickness of about 0.45 to about 0.75 mm, including from about 0.55 to about 0.65 mm.

Suitable fibers that may be used to form the nonwoven mats of the present disclosure include any type of glass, such as A-type glass fibers, C-type glass fibers, E-type glass fibers, S-type glassfibers, ECR-type glass fibers (e.g., ADVANTEX glass fibers commercially available from Owens Corning), HIPER-TEX, wool glass fibers, or combinations thereof.

It is contemplated that in addition to or in place of the glass fibers, the fibrous material used to form the mats include synthetic polymers such as polyester, polyamide, aramid, and mixtures thereof. As a further alternative or supplement, natural fibers may be used as the fiber material. The term "natural fiber" as used in conjunction with the present disclosure refers to plant fibers extracted from any part of a plant, including, but not limited to, the stem, seeds, leaves, roots, or phloem. Examples of natural fibers suitable for use as the fiber material include cotton, jute, bamboo, ramie, bagasse, hemp, coir, linen, kenaf, sisal, flax, henequen, and combinations thereof. Carbon fibers may be also used as the fiber material. In preferred embodiments, however, the fibers are chopped glass fibers.

The non-woven fiber mat can be used as a substrate or membrane used in construction boards, such as facers for insulation boards or gypsum boards. Referring to the insulation boards, boards often takes the form of a core polymeric foamed thermoset material such as polyurethane, polyisocyanurate, polyurethane modified polyisocyanurate (often referred to as polyiso) or phenolic resin, disposed adjacent to at least one facer (sometimes referred to as facing sheets). Typically, the foam core is disposed between two facers. Similarly, referring to the gypsum boards, the board often takes the form of a core gypsum material, disposed adjacent to at least one facing sheet or facer, most typically disposed between two facer sheets. Although, such construction boards have been illustrated in the form of "sandwich" panels or boards wherein the foam or gypsum core is covered with a facer on both sides, it may also include a board having a facer of this type only on one side. The other side may have another type of facer or none at all, depending on the manner in which it is to be used.

In accordance with the present disclosure, a facer for a construction board comprises the nonwoven fiber mat disclosed herein and a facer coating applied to at least a portion of the nonwoven mat. In accordance with the present disclosure, a foam insulation board comprises at least one facer disclosed herein disposed adjacent to a foam core. The foam core comprises one or more of polyurethane, polyisocyanurate, polyurethane modified polyisocyanurate, and phenolic resin. In accordance with the present disclosure, a gypsum board comprising at least one facer of the present disclosure disposed adjacent to a gypsum core.

When used in connection with a construction board, such as part of (e.g., substrate of) a facer board, the nonwoven fiber mats of the present disclosure comprise a blend of different size chopped fibers. For example, an exemplary blend of chopped fibers used to form the nonwoven mats of the present disclosure include from about 50% to about 100% of chopped fibers having a length of about 16 to about 20 mm and a diameter of about 12 to about 14 μm and from about 0 to about 50% of chopped fibers having a length of about 9 mm to about 11 mm and a diameter of about 9 to about 10 μm. In accordance with exemplary embodiments, at least a portion of the blend of chopped fibers are glass fibers disclosed herein, including ECR-type fibers.

When used in connection with a construction board, such as part of (e.g., substrate of) a facer for a construction board, the nonwoven fiber mats of the present disclosure have a basis weight of about 0.012 to about 0.018 lb/ft$^2$ (about 60 to about 88 gsm), including about 0.0135 to about 0.015 lb/ft$^2$ (about 66 to about 75 gsm).

In accordance with other embodiments, the nonwoven fiber mats of the present disclosure can be used in other fibrous products such as substrates or membranes used in roofing shingles, flooring tiles, ceiling tiles, filters, and in vehicles (e.g., ground-based vehicles or aircraft).

Facers

As discussed above, the nonwoven mats of the present disclosure having the two-part binder system may be used as facers for construction boards, such as facers for foam insulation boards or facers for gypsum boards.

The facers comprise a facer coating applied to at least a portion of a nonwoven mat according to the present disclosure. Exemplary facer coatings compositions, which when cured or dried form the facer coatings of the present disclosure, comprise an organic binder and an inorganic filler. The facer coating composition comprises organic binder in an amount from about 3% to about 25% by weight solids based on the total weight of the facer coating composition, including about 5% to about 10% by weight solids and about 6% to about 8% by weight solids based on the total weight of the facer coating composition. The facer coating composition comprises inorganic filler in an amount from about 75% to about 95% by weight solids based on the total weight of the facer coating composition, including about 87% to about 93% by weight solids and about 91% to about 93% by weight solids based on the total weight of the facer coating composition. The facer coating compositions also comprise water or other suitable solvent in an amount to obtain the desired viscosity of the coating composition.

Examples of suitable organic binders for use in the facer composition include, but are not limited to, polyvinyl chloride, acrylic-based binders and esters thereof such as styrene/acrylic or methacrylic esters, ethylene/vinyl chlorides or ethylene/vinyl polyurethanes, ethylene vinyl acetate (EVA), polyisoprene, polyvinylidene chloride, polyvinyl acetate/polyvinyl chloride and synthetic rubbers such as poly(styrene-butadiene-styrene) (SBS), poly(styrene-butadiene) (SBR), neoprene, etc. and any other thixotropic latex polymer and mixtures of the foregoing. An acrylic-based binder or a styrene-butadiene-rubber (SBR)-based binder is preferred.

Examples of suitable inorganic fillers for use in the facer composition include, but are not limited to, calcium carbonate and/or limestone, aluminum hydroxide, zinc oxide, mixed oxides, iron oxides, chromates, glass beads, silicates, clay, sand, mica, talc, kaolin, other stone dusts, gypsum, aluminum silicate, flame retardant aluminum trihydrate, ammonium sulfamate, antimony oxide, calcium silicate, calcium sulfate, and mixtures thereof.

If a firmer coating is desired, a small level of crosslinking agent or a small amount of a thermosetting resin may be introduced to the facer coating. Other components or additives may be added as necessary to achieve the desirable properties of the facer coating, including but not limited to, a dispersing agent for the inorganic fillers such as sodium polyacrylate, a viscosity modifier such as silicone fluid or VANZAN which is a high molecular weight water soluble polysaccharide; antimicrobial agents; and fire retardants. Furthermore, as an alternative or in addition to the organic binder, an inorganic binder may be used in the facer coating compositions. Examples of inorganic binders which may be used in the facer coating compositions include, but are not limited to the following: calcium oxide, calcium silicate, calcium sulfate, magnesium oxychloride, magnesium oxysulfate, and other compounds of some Group IIA elements (alkaline earth metals), as well as aluminum hydroxide. One example of an inorganic binder is Portland cement, which is a mixture of various calcium-aluminum silicates.

The viscosity of the facer coating must be such to preferably prevent full penetration of the facer coating composition to the nonwoven fiber mat. Ideally the facer coating should remain on only one side of the mat such that the glass fibers are exposed to foam or gypsum penetration and bonding. Optionally, such facer coating may impregnate the mat, but in certain applications, this may not be desirable. Exemplary facer coating compositions in accordance with the present disclosure have a total solids content of about 60% to about 80% based on the weight of the total facer coating composition, including about 65% to about 75% solids.

The facer coating composition may be applied and dried or cured in any suitable manner to the nonwoven mat to achieve the desired coating profile. For example, the facer coating composition can be applied via knife coating, curtain coating, spray coating, and roll coating to the mat prior to drying and/or curing.

The facer of the present disclosure has a basis weight of about 0.05 to about 0.08 lb/ft$^2$ (about 244 to about 391 gsm), including a basis weight of about 0.06 to about 0.07 lb/ft$^2$ (about 293 to about 342 gsm).

It should be understood that after a facer coating is applied to the nowoven fiber mat, the porosity of the mat will decrease due to the additional layer of material on the mat. The porosity of the facer is important at least in some construction boards, for example in foam insulation boards, to prevent bleed-through of the foamable composition when the board is being formed. The porosity of the facer, unless otherwise indicated herein, is characterized using a Gurley gas permeability measured by the Gurley second. The Gurley second or Gurley unit is a unit describing the number of seconds required for 100 cubic centimeters (1 deciliter) of air to pass through 1.0 square inch (6.45 cm$^2$) of the facer at a pressure differential of 4.88 inches of water (0.176 psi or 1.22 kPa) (ISO 5636-5:2003). Unless otherwise indicated herein, the Gurley gas permeability was performed at room temperature and humidity (e.g., about 70° F. and about 65% relative humidity). A facer for a construction board comprising the nonwoven fiber mats of the present disclosure comprising a facer coating applied to at least a portion of the nonwoven mat, when the facer has a weight of about 0.065 lb/ft$^2$ (about 317 gsm) and about 25% by weight solids of the two-part binder system and facer coating based on the total weight of the facer, has an average Gurley gas permeability of about 1400 s to about 2150 s. In certain embodiments, when the facer has a weight of about 0.065 lb/ft$^2$ (about 317 gsm) and about 25% by weight solids of the two-part binder system and facer coating based on the total weight of the facer, the facer has an average Gurley gas permeability of about 1550 s to about 2000 s.

In accordance with certain embodiments, the facers of the present disclosure also exhibit enhanced tensile strength at least as compared to a comparable facer mat prepared using a nowoven mat formed from formaldehyde-free acrylic binder system alone (same basis weight and percent solids but without the first part carbohydrate-based binder component) and the same facer coating. As shown in Example 7, a facer formed with the two-part binder system of the present disclosure has a higher average machine direction tensile strength (about 645 N/50 mm or about 145 lbs/2 inch) as compared to a comparable nonwoven fiber mat prepared using a formaldehyde-free acrylic binder system alone (about 542.7 N/50 mm or about 122 lbs/2 inch). In addition, as shown in Example 7, the facer formed with the two-part binder system of the present disclosure also has a higher average cross direction tensile strength (about 507.1 N/50 mm or about 114 lbs/2 inch) as compared to a comparable nonwoven fiber mat prepared using a formaldehyde-free acrylic binder system alone (about 462.6 N/50 mm or about 104 lbs/2 inches). Again, it appears that the particular combination and arrangement of the two-part binder system of the present disclosure unexpectedly provides enhanced tensile properties over comparable mats.

EXAMPLES

Example 1

A nonwoven glass mat comprising the two-part binder system of the present disclosure was prepared in the following manner. A 70/30 blend of chopped ECR glass fibers, with 70% of 18 mm long and 13 μm diameter fibers and 30% of 10 mm long and 10 μm diameter fibers, were formed into a web of randomly oriented fibers using a wet-laid process as disclosed herein. A first-part formaldehyde-free carbohydrate-based binder comprising an aqueous mixture containing about 56.9% by weight solids of a polyacrylic acid, about 42.5% by weight solids of a maltodextrin, 0.5% by weight solids of γ-aminopropyltriethoxysilane, and 0.1% of a biocide is applied to the web by a curtain coater. The binder is cured using an oven at a temperature of 250° C. for 10 seconds. Following the cure of the carbohydrate-based binder, the second-part formaldehyde-free hydrophobic acrylic-based binder comprising an acrylic and acrylonitrile functional emulsion having a glass transition temperature ($T_g$) of about 29° C. (HYCAR 26921) is applied via a bath, and then dried using an oven at a temperature of 230° C. for 10 seconds. The two-part binder system applied to the nonwoven fiber mats was 50% by weight of the first part binder and 50% by weight of the second part binder.

The resulting nonwoven fiber mats had a basis weight of about 0.015 lb/ft$^2$ (about 75 gsm). The mats also contain about 20% by weight solids of the two-part binder system based on the total weight of the nonwoven fiber mat.

Example 2

A comparative nonwoven fiber mat identical to the first, except comprising only the second-part formaldehyde-free acrylic-based binder of the two-part binder, i.e., an acrylic and acrylonitrile functional emulsion having a glass transition temperature ($T_g$) of about 29° C. (HYCAR 26921), was prepared in the same manner as Example 1, although all of the binder was applied in a single step via a curtain coater (there was no second step application through a bath like in Example 1) and then dried using an oven at a temperature of 230° C. for 10 seconds. The same glass fiber blend and the same total amount of binder was used as in Example 1.

The resulting comparative nonwoven fiber mats had a basis weight of about 0.015 lb/ft$^2$ (about 75 gsm). The comparative nonwoven fiber mats also contain about 20% by weight solids of the acrylic-based binder based on the total weight of the nonwoven fiber mat.

Example 3

The Frazier permeability test disclosed herein was performed on the nonwoven fiber mat of Example 1 with the two-part binder of the present invention, the comparative nonwoven fiber mat of Example 2 with the acrylic-only binder, and a commercially available nonwoven fiber mat made using the same glass blend and content as the mats of Examples 1 and 2 but prepared using a urea-formaldehyde (UF) binder and having basis weight of about 0.015 lb/ft² (about 75 gsm) and about 20% by weight solids of the UF binder based on the total weight of the nonwoven fiber mat. The machine direction (MD) and cross direction (CD) tensile strengths of the nonwovens of Examples 1 and 2 were also tested using an Instron machine. The moisture of the nonwoven fiber mats of Examples 1 and 2 were also tested using a drying oven set at 105° C. following TAPPI method T412 om-02. The results are shown in Table 2 below:

TABLE 2

| Sample | Frazier Permeability | Avg MD Tensile in N/50 mm (lbf/2 inch) | Avg CD Tensile in N/50 mm (lbf/2 inch) | Moisture |
|---|---|---|---|---|
| Example 1 (two-part binder) | 701 CFM (19.9 m³/min) | 264 (59.3) | 194 (43.6) | 0.5% ± 0.3% |
| Example 2 (comparative-acrylic-only binder) | 728 CFM (20.6 m³/min) | 238 (53.5) | 196 (44) | 1.0% ± 0.3% |
| Commercially available non-woven mat with UF binder | 755 CFM (21.4 m³/min) | — | — | — |

As shown in Table 2, the nonwoven fiber mat containing the two-part binder of the present disclosure (Example 1) has a lower permeability and thus a lower porosity as compared to the other two mats, even though the other two mats contained the same amount of binder. Notably, the comparative mat of Example 2 has the same outer surface layer (i.e., the acrylic binder layer), but had a different permeability suggesting that that mat of Example 1 has different volumetric or bulk properties resulting from the particular combination and arrangement of the two-part binders used according to the binder system of the present disclosure. Similarly, the lower moisture uptake in the mat of Example 1 (about half of that of Example 2's mat) despite having the same surface layer also suggests that the lower permeability/porosity improves the moisture resistance of the nonwoven fiber mat. In addition, the mat formed from the two-part binder of the present disclosure (Example 1) also exhibits a higher average machine direction tensile strength (about 264 N/50 mm) as compared to the comparative mat containing the acrylic-only binder (Example 2 at about 238 N/50 mm).

Example 4

A nonwoven fiber mat was made in an identical manner as that of Example 1 with the two-part glass binder system, except that less glass fibers were used. As a result, a nonwoven mat formed using the two-part binder of Example 1 had a basis weight of about 1.4 lb/ft² (about 70 gsm) and about 20% by weight solids of the two-part binder system based on the total weight of the nonwoven fiber mat.

Example 5

A nonwoven fiber mat was made in an identical manner as that of Example 4, except that the first-part carbohydrate based binder was replaced with the formaldehyde-free acrylic-based binder used in Example 2, i.e., an acrylic and acrylonitrile functional emulsion having a glass transition temperature ($T_g$) of about 29° C. (HYCAR 26921). In other words, the mat was formed by applying half of the acrylic-based binder and drying using an oven at a temperature of 230° C. for 10 seconds, followed by a second, separate application of the second half of the acrylic based binder and drying using an oven at a temperature of 230° C. for 10 seconds. The resulting comparative nonwoven mat formed using the two-part application of the acrylic-based binder (but with the same amount of glass and same amount of binder as Example 4) had a basis weight of about 1.4 lb/ft² (about 70 gsm) and about 20% by weight solids of the two-part binder system based on the total weight of the nonwoven fiber mat.

Example 6

The Frazier permeability test disclosed herein was performed on the nonwoven fiber mat of Example 4 with the two-part binder of the present invention and the comparative nonwoven fiber mat of Example 5 with the two-part acrylic-only binder. The results are shown in Table 3 below:

TABLE 3

| Sample | Frazier Permeability |
|---|---|
| Example 4 (two-part binder) | 748 CFM (21.2 m³/min) |
| Example 5 (comparative-two-part acrylic-only binder) | 789 CFM (22.3 m³/min) |

As shown in Table 3, the nonwoven fiber mat containing the two-part binder of the present disclosure (Example 4) has a lower permeability and thus a lower porosity as compared to the comparative nonwoven fiber mat containing the two-part acrylic binder (Example 5). Notably, even though both mats were prepared in an identical manner except for the composition of the first-part binder (carbohydrate-based in Example 4 vs. acrylic-based in Example 5), they still had a different permeability suggesting that that mat of Example 4 has different volumetric or bulk properties resulting from the particular combination and arrangement of the two-part binders used according to the binder system of the present disclosure.

Example 7

A facer coating composition was prepared by preparing an aqueous mixture containing 0.125% by weight solids of sodium polyacrylate dispersing agent (2-propenoic acid homopolymer sodium salt), 92.71% by weight solids of calcium carbonate, 7.01% of an acrylic binder (an acrylic styrene emulsion), and 0.155% by weight solids of diidomethyl-ptolylsulfone (antimicrobial agent). This facer coating composition was applied to the nonwoven fiber mats of Examples 1 and 2 by knife coating and cured using a VITS oven at a temperature of 575° C. for 12 seconds. This facer coating was also applied to the same commercially available nonwoven fiber mat made with the UF binder and tested in Example 3.

The resulting facers have about 25% by weight solids of the respective two-part binder systems and facer coating based on the total weight of the facer.

The Gurley gas permeability test disclosed herein was performed on the facers of Example 7. The machine direction (MD) and cross direction (CD) tensile strengths of the facers were also tested using an Instron machine. The results are shown in Table 4 below.

TABLE 4

| Sample | Avg Basis Weight in lb/ft² (gsm) | Gurley (s) | Avg Gurley (s) | Avg MD Tensile in N/50 mm (lbf/2 inch) | Avg CD Tensile in N/50 mm (lbf/2 inch) |
|---|---|---|---|---|---|
| Facer with mat of Example 1 | 0.064 (312) | 1851 1998 1560 | 1803 | 645 (145) | 507.1 (114) |
| Facer with mat of Example 2 | 0.064 (312) | 1358 1387 1260 | 1335 | 542.7 (122) | 462.6 (104) |
| Facer with commercially available non-woven mat with UF binder | 0.067 (327) | 1160 1198 1174 1284 1244 | 1289 | 734 (165) | 538.2 (121) |

As shown in Table 4, the facer containing the two-part binder of the present disclosure (Example 1) has a higher average Gurley second and thus lower permeability and porosity as compared to the comparative facer containing the acrylic-only binder (Example 2). The facer containing the two-part binder of the present disclosure (Example 1) also exhibits a higher average machine direction tensile strength (about 645 N/50 mm) as compared to the comparative facer containing the acrylic-only binder (Example 2 at about 542.7 N/50 mm). The facer containing the two-part binder of the present disclosure (Example 1) also exhibits a higher average cross direction tensile strength (about 507.1 N/50 mm) as compared to the comparative facer containing the acrylic-only binder (Example 2 at about 462.2 N/50 mm).

While various exemplary embodiments of the invention are described herein, other systems similar or equivalent to those described herein are encompassed by the general concepts of the present document. While the general concepts are susceptible of embodiment in many different forms, at least one specific embodiment of such concepts is described herein in detail with the understanding that the present document is to be considered as an exemplification of the principles of the general concepts. The scope of the general concepts is thus not intended to be limited to the particular exemplary embodiment(s) shown and described herein. From the description given, those skilled in the art will not only understand the general concepts and their attendant advantages, but will also find apparent various changes and modifications to the methods and systems of the present document.

Unless defined otherwise, all technical and scientific terms used herein have the same meaning as commonly understood by one of ordinary skill in the art to which the subject matter of the present technology belongs.

Unless otherwise indicated (e.g., by use of the term "precisely"), all numbers expressing quantities as used in this document are to be understood as being modified in all instances by the term "about." Accordingly, unless otherwise indicated, the numerical properties set forth in this document are approximations that may vary depending on the desired parameters and properties sought to be obtained in embodiments described herein. Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All percentages, parts and ratios as used herein, are by weight of the total composition, unless otherwise specified. All such weights, as they pertain to listed ingredients, unless indicated herein, are based on the active level and, therefore, do not include solvents or by-products that may be included in commercially available materials, unless otherwise specified.

All references to singular characteristics or limitations of the general inventive concepts including references to "a", "an", and "the" shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The compositions, articles, products, and methods may comprise, consist of, or consist essentially of the essential elements of the compositions, articles, products, and methods as described herein, as well as any additional or optional element described herein or otherwise useful in nonwoven mat applications.

What is claimed is:

1. A nonwoven fiber mat comprising:
   randomly oriented fibers; and
   a two-part binder system applied to at least a portion of the randomly oriented fibers, wherein the binder system comprises:
      a formaldehyde-free carbohydrate-based binder, and
      a formaldehyde-free hydrophobic acrylic-based binder,
   wherein the formaldehyde-free hydrophobic acrylic-based binder is applied over the formaldehyde-free carbohydrate-based binder,
   and wherein the formaldehyde-free acrylic-based binder is impregnated within the nonwoven fiber mat.

2. The nonwoven fiber mat of claim 1, wherein the mat has a basis weight of about 0.012 to about 0.018 lb/ft² (about 60 to about 88 gsm).

3. The nonwoven fiber mat of claim 1, wherein the nonwoven fiber mat comprises from about 10% to about 30% by weight solids of the two-part binder system based on the total weight of the nonwoven fiber mat.

4. The nonwoven fiber mat of claim 1, wherein the carbohydrate-based binder comprises a carbohydrate and a crosslinking agent.

5. The nonwoven fiber mat of claim 4, wherein the carbohydrate comprises a polysaccharide having a dextrose equivalence of 2 to 20.

6. The nonwoven fiber mat of claim 4, wherein the carbohydrate comprises a water soluble polysaccharide.

7. The nonwoven fiber mat of claim 4, wherein the carbohydrate comprises maltodextrin, dextrin, starch, modified starch, starch derivative, or combinations thereof.

8. The nonwoven fiber mat of claim 4, wherein the carbohydrate-based binder comprises from about 30% to about 60% by weight solids of carbohydrate.

9. The nonwoven fiber mat of claim 4, wherein the crosslinking agent comprises a polycarboxylic acid, a salt of polycarboxylic acid, an anhydride, a polyacrylic acid, a salt of polyacrylic acid, a polyacrylic acid-based resin, or combinations thereof.

10. The nonwoven fiber mat of claim 4, wherein the carbohydrate-based binder further comprises a coupling agent.

11. The nonwoven fiber mat of claim 1, wherein the acrylic-based binder has acrylic and/or acrylonitrile functionality.

12. The nonwoven fiber mat of claim 1, wherein the acrylic-based binder is applied as an emulsion or latex.

13. The nonwoven fiber mat of claim 1, wherein the hydrophobic acrylic-based binder has a glass transition temperature (Tg) of greater than 20° C.

14. The nonwoven fiber mat of claim 1, wherein the randomly oriented fibers comprise glass fibers, synthetic polymer fibers, natural fibers, or combinations thereof.

15. The nonwoven fiber mat of claim 1, wherein the mat has a Frazier permeability of about 690 to about 710 CFM (about 19.5 to about 20.1 $m^3$/min).

16. A facer for a construction board comprising the nonwoven fiber mat of claim 1 and a facer coating applied to at least a portion of the nonwoven fiber mat, when the facer has a basis weight of about 0.05 to about 0.08 lb/$ft^2$ (about 244 to about 391 gsm) and about 10% to about 30% by weight solids of the two-part binder system and facer coating based on the total weight of the facer, the facer has an average Gurley gas permeability of about 1400 s to about 2150 s.

17. The facer of claim 16, wherein the facer has a basis weight of about 0.065 lb/$ft^2$ (about 317 gsm).

18. A foam insulation board comprising at least one facer of claim 16 disposed adjacent to a foam core.

19. The foam insulation board of claim 18, wherein the foam core is selected from the group consisting of polyurethane, polyisocyanurate, polyurethane modified polyisocyanurate, and phenolic resin.

20. A gypsum board comprising at least one facer of claim 16 disposed adjacent to a gypsum core.

* * * * *